Patented May 28, 1929.

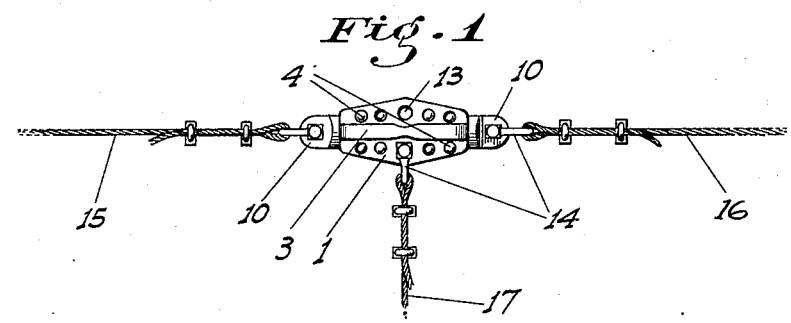
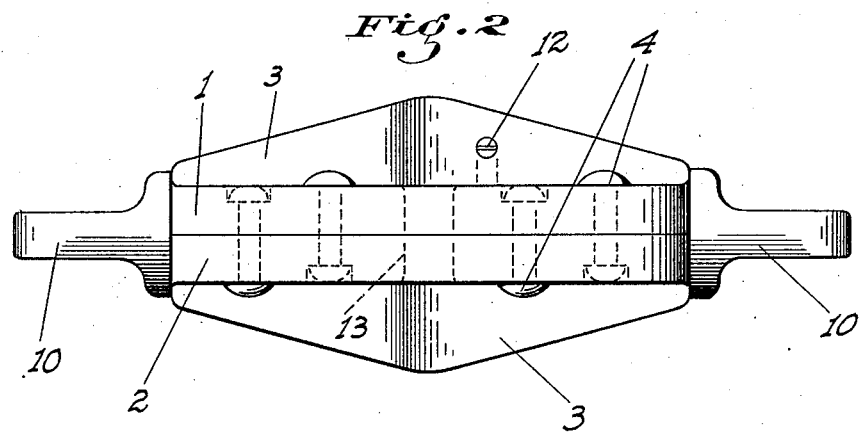
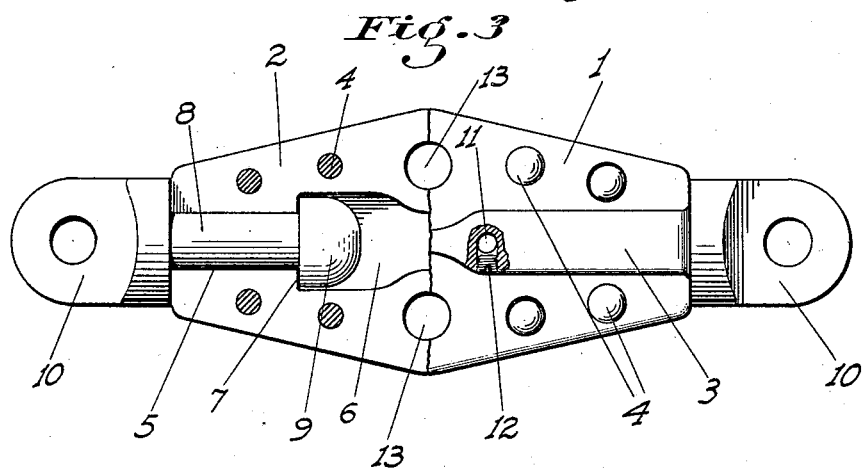

1,714,768

UNITED STATES PATENT OFFICE.

RICHARD T. FERRY, OF VOLCANO, CALIFORNIA.

COMBINED SWIVEL AND RIGGING PLATE.

Application filed January 28, 1927. Serial No. 164,366.

This invention relates to improvements in devices used in the logging industry, and especially to the rigging plates used in connection with the hauling of the logs from where they are cut to a centralized point from which they may be loaded onto cars or skids. One of these plates is interposed between the main line from the donkey engine and the haul or return line; and a tag line leading to the log to be hauled is attached to one side or the other of the plate. Adjacent the drum of the donkey engine the main line passes upwardly over a derrick mast so that when the log approaches the mast it is raised from the ground. The ordinary rigging plate is so constructed that when the main line is then slacked away and the log detached, the natural tendency of the lines to twist cause the rigging plate to be turned and the tag line to be wrapped and tangled thereabout. Considerable time must then be consumed in straightening out the lines before further hauling operations can be carried out.

The principal object of my invention therefore is to eliminate the above objectionable feature by providing a rigging plate so constructed that both the main and haul lines will be individually and swivelly connected to the plate, so that there is no tendency for the plate to be turned, since the swivel connections of the lines with the plate take care of any twisting tendency of said lines without moving the plate. I have also arranged for these swivel connections to be maintained in a constantly lubricated condition so that there is no tendency for such connections to bind and fail to function.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a top plan view of my improved device, showing the same as connected to the various lines.

Fig. 2 is a side elevation of the device.

Fig. 3 is a top plan view of the same, one half of the top body section being removed.

Referring now more particularly to the characters of reference on the drawings, the device comprises a body formed of a pair of superimposed members 1 and 2 with centrally disposed and longitudinal ribs 3 projecting outwardly from the opposite faces thereof. These ribs serve not only to strengthen the members 1 and 2 but also as shoes or runners for engagement with the ground. The outer edges of the ribs and the members 1 and 2 slope outwardly from both ends toward the middle, so that the structure is thickest both ways at its center of length, and the ends do not tend to dig into the ground and interfere with the movement of the device along the ground. The members 1 and 2, when all the parts hereafter described are assembled therewith, are rigidly secured together by rivets 4 or the like placed through said members at longitudinally spaced intervals on both sides of the central ribs 3.

Drilled lengthwise into the members 1 and 2 from both ends are bores 5 terminating at their inner ends in an enclosed and intercommunicating chamber 6, which forms shoulders 7 at its junction with the bores 5. Each bore forms a bearing and support for a stem 8 having a head 9 on its inner end projecting into the chamber 6 and bearing against the shoulder 7. The outer ends of both pins carry rigid eyes 10. A passage 11 is drilled from the side of one rib 3 into the chamber 6 to enable grease to be fed into said chamber, the outer end of the passage being normally closed by a removable screw plug 12. The members 1 and 2 centrally of their length are provided with vertical and transversely opposed holes 13 therethrough. When connecting the device to the operating cables clevises 14 are applied to the eyes 10 and to one of the holes 13, depending on which side of the device the logs to be hauled are disposed. The main line 15 from the donkey engine is connected to one end clevis, the haul or return line 16 is connected to the other end clevis, while the tag line 17 is connected to the side clevis. It will therefore be seen that if at any time a twisting tendency develops in the main or haul lines such tendency merely causes a rotation of the eyes and stems to take place without rotating the entire plate structure, so that there is never any tendency for the tag line to become wrapped around the rigging plate. The stems and heads of the eyes being in contact with the grease in the chamber 6, said stems are always maintained in free running engagement with the plate so that there is no tendency for any binding in the body to take place.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A rigging plate structure comprising a body, longitudinally alined and separate stems swivelly mounted in the body and projecting from the outer ends thereof, and ribs on both sides of the body, both ribs being orificed to receive clevis pins therethrough.

In testimony whereof I affix my signature.

RICHARD T. FERRY.